(12) United States Patent
Fildebrandt (10) Patent No.: US 9,411,665 B2
(45) Date of Patent: Aug. 9, 2016

(54) MESSAGING INFRASTRUCTURE INTEGRATION

(75) Inventor: Ulf Fildebrandt, Oftersheim (DE)

(73) Assignee: SAP SE, Walldorf (DE)

( * ) Notice: Subject to any disclaimer, the term of this patent is extended or adjusted under 35 U.S.C. 154(b) by 270 days.

(21) Appl. No.: 13/603,915

(22) Filed: Sep. 5, 2012

(65) Prior Publication Data

US 2014/0068630 A1    Mar. 6, 2014

(51) Int. Cl.
*G06F 9/46* (2006.01)
*G06F 9/54* (2006.01)

(52) U.S. Cl.
CPC .......... *G06F 9/546* (2013.01); *G06F 2209/547* (2013.01)

(58) Field of Classification Search
None
See application file for complete search history.

(56) References Cited

U.S. PATENT DOCUMENTS

| | | | |
|---|---|---|---|
| 5,926,636 A * | 7/1999 | Lam et al. ................ 719/313 |
| 7,461,346 B2 | 12/2008 | Fildebrandt |
| 7,584,457 B2 | 9/2009 | Hammerich et al. |
| 7,590,614 B2 | 9/2009 | Fildebrandt et al. |
| 7,734,560 B2 | 6/2010 | Seeger et al. |
| 7,739,699 B2 * | 6/2010 | Andreeva et al. ........... 719/330 |
| 7,757,204 B2 | 7/2010 | Fildebrandt et al. |
| 7,770,103 B2 | 8/2010 | Hammerich et al. |
| 7,774,745 B2 | 8/2010 | Fildebrandt et al. |
| 7,840,935 B2 | 11/2010 | Fildebrandt et al. |
| 7,840,936 B2 | 11/2010 | Seeger et al. |
| 7,853,923 B2 | 12/2010 | Muenkel et al. |
| 7,873,942 B2 | 1/2011 | Shaburov et al. |
| 7,962,892 B2 | 6/2011 | Shaburov et al. |
| 8,126,961 B2 | 2/2012 | Fildebrandt |
| 8,341,593 B2 | 12/2012 | Fildebrandt et al. |
| 8,689,174 B2 | 4/2014 | Shaburov et al. |
| 2009/0006167 A1 * | 1/2009 | Toussaint et al. ................ 705/8 |
| 2011/0154231 A1 * | 6/2011 | Cherdman ................ G06F 15/16 715/764 |
| 2011/0295922 A1 * | 12/2011 | Vecera et al. ................ 709/201 |
| 2012/0030275 A1 * | 2/2012 | Boller ................ G06F 17/30902 709/203 |
| 2014/0006576 A1 * | 1/2014 | Akolkar et al. ................ 709/223 |

* cited by examiner

*Primary Examiner* — Umut Onat
(74) *Attorney, Agent, or Firm* — Fish & Richardson P.C.

(57) ABSTRACT

Techniques for integrating a messaging infrastructure with an existing application computing system include integrating an enterprise service bus (ESB) with an existing application computing system, the application computing system including one or more processing modules providing one or more functionalities; receiving, by the integrated ESB, one or more messages from one or more client computing devices communicatively coupled with the application computing system; managing, by the integrated ESB, the application computing system such that the application computing system communicates with the one or more client computing devices; and transferring, by the integrated ESB, the one or more received messages between the application computing system to one or more of the one or more client computing devices by utilizing the one or more processing modules and the one or more functionalities of the application computing system.

20 Claims, 3 Drawing Sheets

MESSAGING INFRASTRUCTURE INTEGRATION

TECHNICAL BACKGROUND

This disclosure relates to messaging infrastructure integration and, more particularly, integrating a messaging infrastructure with an existing application computing system.

BACKGROUND

Messaging infrastructures exchange messages between computing systems in a computing network via protocols like Simple Object Access Protocol (SOAP), JAVA Message Service (JMS), and Request for Comments (RFC). Such message infrastructures typically are implemented as a separate system from the remaining computing system of a computing network, thus increasing the total cost of ownership (TCO) to the customer.

SUMMARY

The present disclosure relates to computer-implemented methods, software, and systems for integrating a messaging infrastructure with an existing application computing system. In some embodiments, an enterprise service bus (ESB) is integrated with an existing application computing system. In some examples, the application computing system includes processing modules that provide one or more functionalities. The integrated ESB receives messages from client computing devices that are communicatively coupled with the application computing system. Furthermore, the integrated ESB manages the application computing system such that the application computing system communicates with the client computing devices. The integrated ESB transfers the messages between the application computing system to the client computing devices by utilizing the processing modules and the functionalities of the application computing system.

A general embodiment of the subject matter described in this disclosure can be implemented in methods that include integrating an enterprise service bus (ESB) with an existing application computing system, the application computing system including one or more processing modules providing one or more functionalities; receiving, by the integrated ESB, one or more messages from one or more client computing devices communicatively coupled with the application computing system; managing, by the integrated ESB, the application computing system such that the application computing system communicates with the one or more client computing devices; and transferring, by the integrated ESB, the one or more received messages between the application computing system to one or more of the one or more client computing devices by utilizing the one or more processing modules and the one or more functionalities of the application computing system.

Other general embodiments include corresponding computer systems, apparatus, and computer programs recorded on one or more computer storage devices, each configured to perform the actions of the methods. A system of one or more computers can be configured to perform operations to perform the actions. One or more computer programs can be configured to perform particular operations or actions by virtue of including instructions that, when executed by data processing apparatus, cause the apparatus to perform the actions.

A first aspect combinable with any of the general embodiments includes integrating the ESB as a runtime system with the application computing system.

A second aspect combinable with any of the previous aspects includes the application computing system differing from an implementation of at least one of the one or more client computing devices.

A third aspect combinable with any of the previous aspects includes selecting one of the one or more client computing devices as the application computing system.

A fourth aspect combinable with any of the previous aspects includes the one or more processing modules including a persistency service module, a secure store module, an user management module, a configuration management service module, an operations module, and a development repository module.

A fifth aspect combinable with any of the previous aspects further includes one or more functionalities of the development repository module includes communicating with an activation proxy of the ESB such that content to be executed by the ESB is transferred to the ESB.

A sixth aspect combinable with any of the previous aspects further includes one or more functionalities of the persistency service module includes communicating with a persistency proxy of the ESB to provide persistency of data.

A seventh aspect combinable with any of the previous aspects further includes one or more functionalities of the secure store module includes communicating with a secure store proxy of the ESB to provide encryption of data.

An eight aspect combinable with any of the previous aspects further includes one or more functionalities of the user management module service module includes communicating with an user management proxy of the ESB to provide management of user login information.

A ninth aspect combinable with any of the previous aspects further includes the one or more processing modules further including an on-boarding infrastructure.

Various embodiments of a computing system according to the present disclosure may have one or more of the following features. For example, the system facilitates minimizing the TCO of a computing system environment including a messaging infrastructure; reducing a footprint of the computing system environment by reusing existing computing modules by the messaging infrastructure; simplification of maintenance of the computing system environment that includes the messaging infrastructure; reduction in redundant implementations of computing modules of the computing system (e.g., by reusing existing computing modules); minimizing of development of the computing system environment including the messaging infrastructure; and reducing total cost of development (TCD) of the computing system environment including the messaging infrastructure.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

This disclosure generally describes computer-implemented methods, software, and systems for integrating a messaging infrastructure with an existing application computing system. In some embodiments, an enterprise service bus (ESB) is integrated with an existing application computing system. In some examples, the application computing system includes processing modules that provide one or more functionalities. The integrated ESB receives messages from client computing devices that are communicatively coupled with the application computing system. Furthermore, the integrated ESB manages the application computing system such that the application computing system communicates with the client computing devices. The integrated ESB transfers the messages between the application computing system to the client computing devices by utilizing the processing modules and the functionalities of the application computing system.

Figure 1:
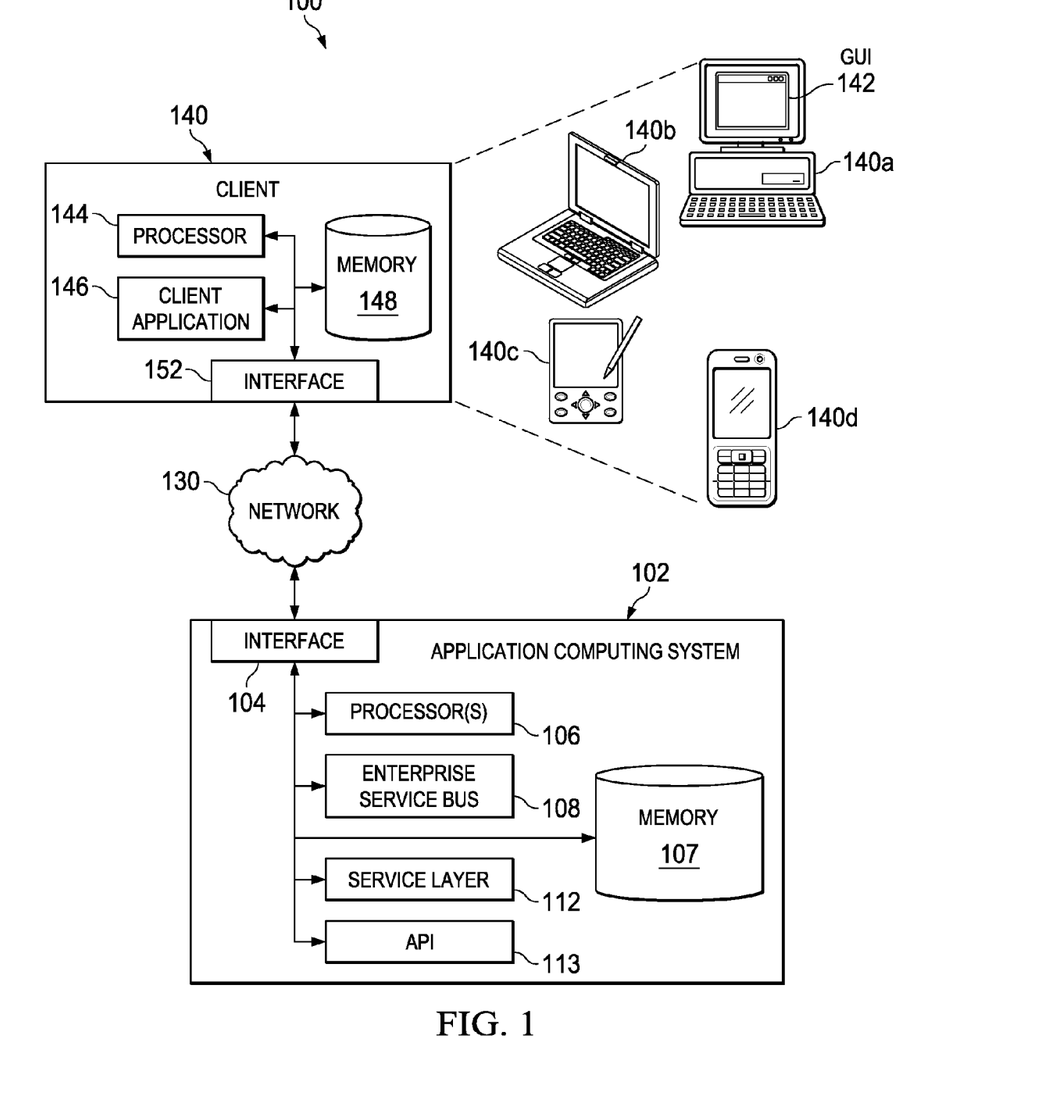
FIG. 1 illustrates an example distributed computing system for integrating a messaging infrastructure with an existing application computing system.

FIG. 1 illustrates an example distributed computing system 100 for integrating a messaging infrastructure with an existing application computing system. At a high-level, the illustrated example distributed computing system 100 includes or is communicably coupled with an application computing system 102 (e.g., a server) and clients 140a-140d (collectively referred to as client 140) that communicate across a network 130. The application computing system 102 comprises a computer operable to receive, transmit, process, store, or manage data and information associated with the example distributed computing system 100. In general, the application computing system 102 is a server that stores an enterprise service bus (ESB) 108, a service layer 112, and an application programming interface (API) 113, where at least a portion of the ESB 108, the service layer 112, and the API 113 are executed using requests and responses sent to a client 140 within and communicably coupled to the illustrated example distributed computing system 100 across the network 130. In some examples, the application computing system 102 is a distributed computing system, such as a server farm (or cluster).

The application computing system 102 is responsible for receiving application requests (e.g., messages), from one or more client applications associated with the client 140 of the example distributed computing system 100 and responding to the received requests by processing the requests by, among other appropriate computing modules, the ESB 108 (or modules under the control of the ESB 108), and sending an appropriate response from the ESB 108 back to the requesting client application. In addition to requests from the client 140, requests associated with the ESB 108 may also be sent from internal users, external or third-party customers, other automated applications, as well as any other appropriate entities, individuals, systems, or computers. According to some implementations, the application computing system 102 may also include or be communicably coupled with an e-mail server, a web server, a caching server, a streaming data server, and/or other appropriate server. In some implementations, the application computing system 102 and related functionality may be provided in a cloud-computing environment.

Specifically, the ESB 108 is integrated (e.g., coupled) with the (existing) application computing system 102 such that the ESB 108 can utilize (e.g., leverage) the functionality (e.g., processing modules) of the application computing system 102. The ESB 108 manages the application computing system 102 such that the application management system 102 communicates with the clients 140. The ESB 108 receives the messages from the clients 140 and transfers the messages between the application computing system 102 and the clients 140 (e.g., a client 140 other than the client 140 that transmitted the message) utilizing the functionalities of the application computing system 120 (and/or processing modules of the application computing system 102).

The application computing system 102 includes an interface 104. Although illustrated as a single interface 104 in FIG. 1, two or more interfaces 104 may be used according to particular needs, desires, or particular implementations of the example distributed computing system 100. The interface 104 is used by the application computing system 102 for communicating with other systems in a distributed environment—including within the example distributed computing system 100—connected to the network 130; for example, the client 140 as well as other systems (not illustrated) communicably coupled to the network 130. Generally, the interface 104 comprises logic encoded in software and/or hardware in an appropriate combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

The application computing system 102 includes a processor 106. Although illustrated as a single processor 106 in FIG. 1, two or more processors may be used according to particular needs, desires, or particular implementations of the example distributed computing system 100. Generally, the processor 106 executes instructions and manipulates data to perform the operations of the application computing system 102. Specifically, the processor 106 executes the functionality required to receive and respond to requests from the client 140.

The application computing system 102 also includes a memory 107 that holds data for the application computing system 102. Although illustrated as a single memory 107 in FIG. 1, two or more memories may be used according to particular needs, desires, or particular implementations of the example distributed computing system 100. While memory 107 is illustrated as an integral component of the application computing system 102, in some implementations, the memory 107 can be external to the application computing system 102 and/or the example distributed computing system 100.

The application computing system 102 further includes a service layer 112. The service layer 112 provides software services to the example distributed computing system 100. The functionality of the application computing system 102 may be accessible for all service consumers using this service layer. For example, in some implementations, the client 140 can utilize the service layer 112 to communicate with the ESB 108. Software services provide reusable, defined business functionalities through a defined interface. While illustrated as an integrated component of the application computing system 102 in the example distributed computing system 100, alternative implementations may illustrate the service layer 112 as a stand-alone component in relation to other components of the example distributed computing system 100. Moreover, any or all parts of the service layer 112 may be implemented as child or sub-modules of another software module, enterprise application, or hardware module without departing from the scope of this disclosure.

The application computing system 102 further includes an application programming interface (API) 113. In some implementations, the API 113 can be used to interface between the ESB 108, and/or one or more components of the application computing system 102 or other components of the example distributed computing system 100, both hardware and software. For example, in some implementation, the ESB 108 can utilize the API 113 to communicate with the client 140. The API 113 may include specifications for routines, data structures, and object classes. The API 113 may be either computer language independent or dependent and refer to a complete interface, a single function, or even a set of APIs. While illustrated as an integrated component of the application computing system 102 in the example distributed computing system 100, alternative implementations may illustrate the API 113 as a stand-alone component in relation to other components of the example distributed computing system 100. Moreover, any or all parts of the API 113 may be implemented as child or sub-modules of another software module, enterprise application, or hardware module without departing from the scope of this disclosure.

The client 140 may be any computing device operable to connect to or communicate with at least the application computing system 102 and/or the ESB 108 using the network 130. In general, the client 140 comprises a computer operable to receive, transmit, process, and store any appropriate data associated with the example distributed computing system 100. The illustrated client 140 further includes a client application 146. The client application 146 is any type of application that allows the client 140 to request and view content on the client 140. In some implementations, the client application 146 can be and/or include a web browser. In some implementations, the client-application 146 can use parameters, metadata, and other information received at launch to access a particular set of data from the application computing system 102. Once a particular client application 146 is launched, a user may interactively process a task, event, or other information associated with the application computing system 102. Further, although illustrated as a single client application 146, the client application 146 may be implemented as multiple client applications in the client 140.

The illustrated client 140 further includes an interface 152, a processor 144, and a memory 148. The interface 152 is used by the client 140 for communicating with other systems in a distributed environment—including within the example distributed computing system 100—connected to the network 130; for example, the application computing system 102 as well as other systems communicably coupled to the network 130 (not illustrated). The interface 152 may also be consistent with the above-described interface 104 of the application computing system 102 or other interfaces within the example distributed computing system 100. The processor 144 may be consistent with the above-described processor 106 of the application computing system 102 or other processors within the example distributed computing system 100. Specifically, the processor 144 executes instructions and manipulates data to perform the operations of the client 140, including the functionality required to send requests to the application computing system 102 and to receive and process responses from the application computing system 102. The memory 148 may be consistent with the above-described memory 107 of the application computing system 102 or other memories within the example distributed computing system 100 but storing objects and/or data associated with the purposes of the client 140.

Further, the illustrated client 140 includes a GUI 142. The GUI 142 interfaces with at least a portion of the example distributed computing system 100 for any suitable purpose, including generating a visual representation of a web browser. In particular, the GUI 142 may be used to view and navigate various web pages located both internally and externally to the application computing system 102. Generally, through the GUI 142, a user of the application computing system 102 is provided with an efficient and user-friendly presentation of data provided by or communicated within the example distributed computing system 100.

There may be any number of clients 140 associated with, or external to, the example distributed computing system 100. For example, while the illustrated example distributed computing system 100 includes one client 140 communicably coupled to the application computing system 102 using network 130, alternative implementations of the example distributed computing system 100 may include any number of clients 140 suitable to the purposes of the example distributed computing system 100. Additionally, there may also be one or more additional clients 140 external to the illustrated portion of the example distributed computing system 100 that are capable of interacting with the example distributed computing system 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 is intended to encompass any computing device such as a desktop computer, laptop/notebook computer, wireless data port, smart phone, personal data assistant (PDA), tablet computing device, one or more processors within these devices, or any other appropriate processing device. For example, the client 140 may comprise a computer that includes an input device, such as a keypad, touch screen, or other device that can accept user information, and an output device that conveys information associated with the operation of the application computing system 102 or the client 140 itself, including digital data, visual information, or a GUI 142, as shown with respect to the client 140. In some implementations, the client 140 includes an application server or an enterprise server.

Figure 2:
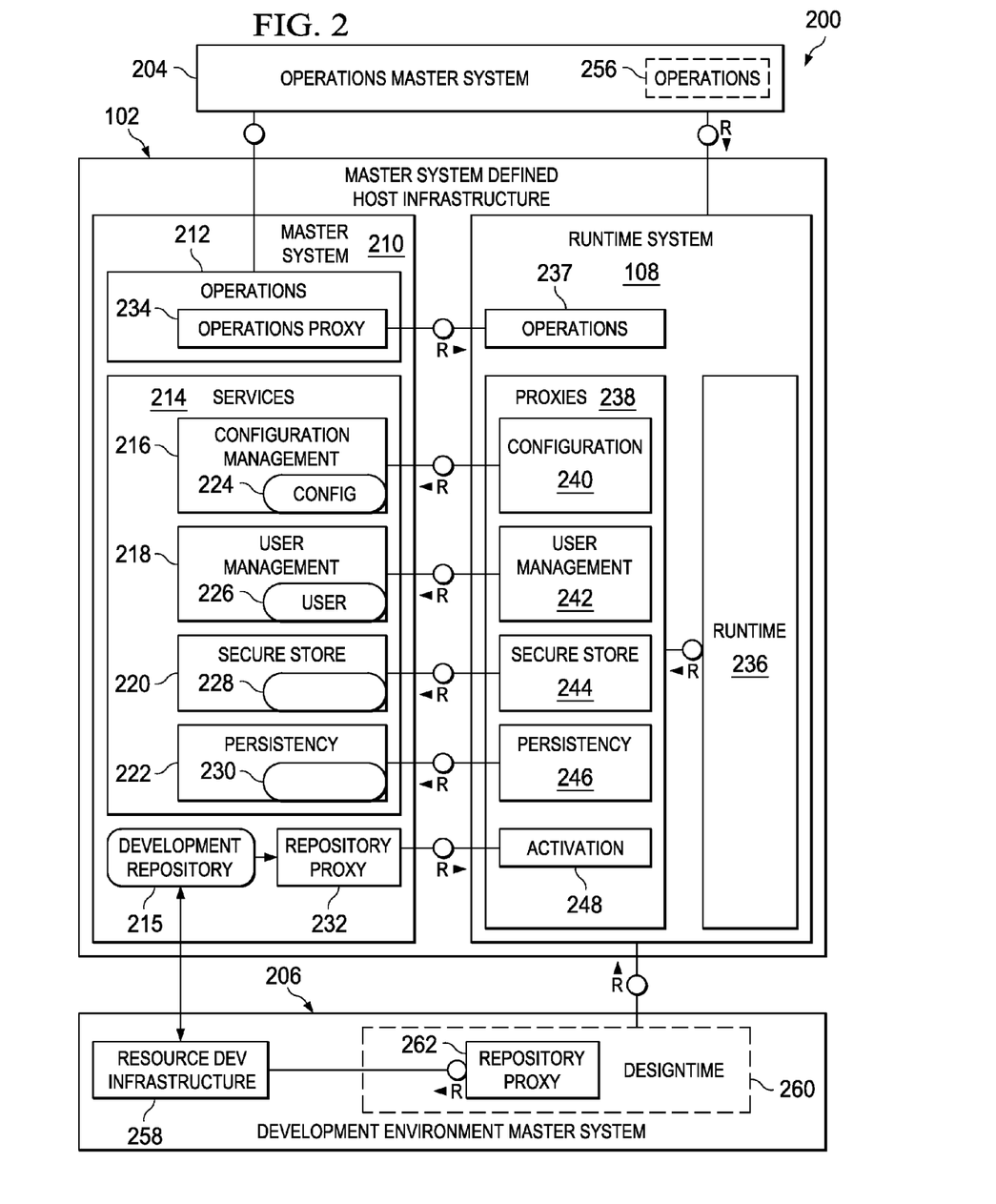
FIG. 2 illustrates an example environment of a distributed computing system operable for integrating a messaging infrastructure with an existing application computing system.

FIG. 2 illustrates an example environment 200 of a distributed computing system operable for integrating a messaging infrastructure with an existing application computing system. The environment 200 includes the application computing system 102, an operations system 204, and a development environment system 206. In some implementations, the application computing system 102, the operations system 204, and the development environment system 206 communicate across a network (e.g., the network 130 of FIG. 1).

The application computing system 102 includes a master system 210 that includes an operations module 212, a services module 214, and a development repository module 215. The services module 214 further includes a configuration management module 216, a user management module 218, a secure store module 220, and a persistency service module 222. Each of the modules 212, 215, 216, 218, 220, 222 includes (or is associated with) a respective proxy 234, 232, 224, 226, 228, 230. Furthermore, each of the modules 212, 215, 216, 218, 220, 222 is associated with (or includes) one or more functionalities, described further below.

The application computing system 102 further includes on-boarding functionality (not shown). Specifically, in some embodiments, each application that is executed by the application computing system 102 requires on-boarding functionality to assign rights (e.g., privileges) to each user and establish properties that are defined by the user.

The application computing system 102 further includes the ESB 108. The ESB 108 includes a runtime module 236, an operation module 237, and proxies 238. Specifically, the ESB 108 includes a configuration proxy 240, a user management proxy 242, a secure store proxy 244, a persistency service proxy 246, and an activation proxy 248. The proxies 238 are in communication with the modules 215, 216, 218, 220, 222 such that the ESB 108 utilizes (e.g., leverages) the functionalities associated with the modules 215, 216, 218, 220, 222, described further below. To that end, the configuration proxy 240 is in communication with the proxy 224 of the configuration management module 216; the user management proxy 242 is in communication with the proxy 226 of the user management module 218; the secure store proxy 244 is in communication with the proxy 228 of the secure store module 220; the persistency service proxy 246 is in communication with the proxy 230 of the persistency service module 222; and the activation proxy 248 is in communication with repository proxy 232. Furthermore, the proxies 238 are in communication with the runtime module 236. Additionally, the operations module 237 is in communication with the operations proxy 234 of the operations module 212 such that the ESB 108 can also utilize the functionalities associated with the operations module 212 of the application computing system 102. In some examples, one or more of the communications between the master system 210 (i.e., the modules/proxies of the master system 210) and the ESB 108 (i.e., the modules/proxies of the ESB 108) can be one-way communication (e.g., asymmetric) and/or can be two-way communication (e.g., symmetric).

The operations system 204 includes an operation module 256. The operations module 256 provides configuration settings, property settings, system status, etc., for maintaining execution of the application computing system 102.

The development environment system 206 includes a resource development infrastructure 258 and a designtime module 260. The designtime module 260 further includes a repository proxy 262. The repository proxy 262 is in communication with the resource development infrastructure 258.

Moreover, the application computing system 102 is in communication with the operations system 204 and the development environment system 206. Specifically, the operations module 212 is in communication with the operations system 204 and the ESB 108 is in communication with the operations module 256. Furthermore, the development repository 216 is in communication with the resource development infrastructure 258 and the ESB 108 is in communication with the designtime 260. In some examples, one or more of the communications between the application computing system 102 and the operations system 204 and between the application computing system 102 and the development environment system 206 can be one-way communication (e.g., asymmetric) and/or can be two-way communication (e.g., symmetric).

To that end, in some examples, a messaging infrastructure is integrated with an existing application computing system. Specifically, the ESB 108 is integrated with the application computing system 102. The application computing system 102 includes processing modules, such as modules 212, 215, 216, 218, 220, 222. The modules 212, 215, 216, 218, 220, 222 provide one or more functionalities. The ESB 108 receives one or more messages from one or more of the clients 140 that are communicatively coupled with the application computing system 102. The ESB 108 manages the application computing system 102 such that the application computing system 102 communicates with the client devices 140. The ESB 108 transfers the messages between the application computing system 102 to the clients 140 utilizing the modules 212, 215, 216, 218, 220, 222 and the functionalities of the modules 212, 215, 216, 218, 220, 222 and the application computing system 102.

Specifically, in some embodiments, the ESB 108 is integrated with the application computing system 102. Integrating the ESB 108 with the application computing system 102 can include embedding the ESB 108 within the framework/infrastructure of the application computing system 102 such that the ESB 108 utilizes ("reuses") the services by the application computing system 102 and "plugs into" the functionalities provided by the application computing system 102. In some examples, integration of the ESB 108 within the application computing system 102 can occur at multiple levels, such as repository integration, hosting infrastructure, on boarding process, support, and on premise/on-demand connectivity, described further below. In some examples, the ESB 108 can be integrated within the application computing system 102 via proxies or embedding. Specifically, with respect to the proxies, the ESB 108 provides one or more proxies (e.g., proxies 240, 242, 244, 246, 248) that are specific to the application computing system 102 and/or the master system 210. Additionally, with respect to embedding, the ESB 108 is embedded into the application computing system 102 and/or the master system 210. In some examples, the application computing system 102 includes (or provides) the (processing) modules 212, 215, 216, 218, 220, 222 that provide one or more functionalities.

To that end, by integrating the ESB 108 with the application computing system 102, the total cost of ownership (TCO) and a total cost of development (TCD) of the environment 200 (e.g., the application computing system 102 and the ESB 108) and/or the distributed computing system 100 is minimized.

In some further embodiments, integrating the ESB 108 with the application computing system 102 can further include integrating the ESB 108 as a runtime system with the application computing system 102. In some examples, the ESB 108 can be implemented as a runtime system such that the ESB 108 is represented as a software component to support execution of a computer program (associated with the ESB 108) by the application computing system 102 (i.e., utilizing the components (e.g., the processor 106) of the application computing system 102). In some examples, integrating the ESB 108 as a runtime system can include the ESB 108 including the runtime module 236 that is in communication with the proxies 240-248 of the ESB 108. To that end, by integrating the ESB 108 as a runtime system with the application computing system 102, services such as persistency of the (runtime) data (e.g., the messages and/or other data associated with the ESB 108), secure store of the data, and user management can be provided. In some examples, the ESB 108 can be executed (e.g., "run") on a virtualized infrastructure (e.g., a virtual machine) of the application computing system 102.

In some embodiments, the ESB 108 receives one or more messages from one or more of the clients 140 that are communicatively coupled with the application computing system 102. Specifically, a particular client 140 (or two or more particular clients 140) transmits a message (or two or more messages) to the ESB 108 via the network 130. The message can include any representation of data, such as text, XML, or binary. Additionally, the message can be provided (e.g., implemented) in a first processing architecture (language) (e.g., JAVA, C++). However, in some embodiments, one or more of the ESB 108 and the application computing system 102 can be implemented in a second processing architecture (e.g., JAVA, C++) that differs than the first processing architecture of the message.

In some further embodiments, the application computing system 102 (or a module and/or proxy of the application computing system 102) receives the one or more message from the one or more clients 140. In some examples, the application computing system 102 transfers the received messages to the ESB 108.

In some further embodiments, upon integration of the ESB 108 with the application computing system 102, the ESB 108 provides an access point to initiate an instance of the ESB 108. The access point depends on, among other things, the use of the instance of the ESB 108. Specifically, for on-demand, an application programming interface (API) is provided to initiate the instance of the ESB 108 automatically, and the information to access the instance of the ESB 108 is returned and stored by the application computing system 102. Furthermore, for on-premise, a script can be employed for the instance of the ESB 108, and the information to employ the instance of the ESB 108 is stored by the application computing system 102.

In some embodiments, the ESB 108 manages the application computing system 102 such that the application computing system 102 communicates with the clients 140. Specifically, the ESB 108 manages one or more of the (processing) modules 212, 215, 216, 218, 220, 222 of the application computing system 102 via one or more of the proxies 238, the operations modules 237, and the runtime module 236. Based upon the received message from the particular client 140 (or two or more particular clients 140) (e.g., based on the specific processing architecture (language) associated with the received message), the runtime module 236 of the ESB 108 communicates with one or more of the proxies 240, 242, 244, 245, 248. Based on the communication from the runtime module 236, one or more of the proxies 240, 242, 244, 246, 248 can communicate with the corresponding one or more of the proxies 224, 226, 228, 230, 232 of the modules 216, 218, 220, 222, 215, respectively.

The communication can include, among other things, instructions regarding processing of the message. To that end, based on the communication from one or more of the proxies 240, 242, 244, 246, 248, one or more of the modules 216, 218, 220, 222, 215 can manage and/or process the message accordingly (e.g., based on the contents of the message and/or based on the processing architecture associated with the message). Similarly, the operations module 237 can provide instructions to the operations module 212 via the proxy 234 regarding processing of the message. In some examples, managing and/or processing the message can include appropriately transferring the message, described further below. To that end, in some examples, the ESB 108 appropriately manages at least a portion of the application computing system 102 (e.g., the messaging infrastructure of the application computing system 102) the such that the application computing 102 communicates with the clients per the ESB 108 and/or instructions provided by the runtime module 236.

In some examples, the processing architecture (e.g., implementation) of the application computing system 102 differs from a processing architecture (e.g., implementation) of one or more of the clients 140. Thus, in correlation to that mentioned above, the message (provided by on one or more of the clients 140) is associated with the processing architecture (e.g., the implementation) of the client 140 (or clients 140) providing the message while the application computing system 102 is associated with a differing processing architecture (e.g., implementation).

In some embodiments, the ESB 108 transfers the received message (from the particular client 140 or clients 140) between the application computing system 102 to one or more of the clients 140 by utilizing the (processing) modules 212, 215, 216, 218, 220, 222 and the functionalities of the application computing system 102 (e.g., the functionalities of the modules 212, 215, 216, 218, 220, 222). Specifically, in some examples, the ESB 108 receives the message (or messages) from one or more particular clients 140, as mentioned above, and transfers the received message utilizing the application computing system 102 and one or more modules 212, 215, 216, 218, 220, 222 and the associated functionalities, described below, of the modules to one or more other clients 140 (e.g., one or more clients 140 other than the particular client(s) 140 that provided (e.g., initiated) the message). In some examples, the message includes (or is associated with) data that identifies (or other ways associated with) another client 140 for which the message is intended for (e.g., for transferring to). For example, the identifying data associated with the message is based on the type of the message (e.g., the programming architecture/language). In some examples, metadata of the message includes the identifying data.

In some examples, as mentioned above, the managing and/or processing of the message by one or more of the modules 212, 215, 216, 218, 220, 222 can include transferring the message to the appropriate client 140 (e.g., the client 140 that is the intended recipient of the message).

In some further embodiments, the functionalities of the modules 212, 215, 216, 218, 220, 222 can facilitate transferring the message between the application computing system 102 to the clients 140. Specifically, the ESB 108 can utilize (e.g., leverage) the modules 212, 215, 216, 218, 220, 222 and the associated functionalities of the modules to facilitate the aforementioned transferring. In some examples, the ESB 108 utilizes the functionalities of the persistency service module 222 by communicating (e.g., providing instructions) with the proxy 230 of the persistency service module 222 via the persistency service proxy 246 of the ESB 108. The persistency service module 222 provides persistency (directly or indirectly) of data (e.g., data associated with the message, and/or data associated with the ESB 108). By utilizing the persistency service module 222 of the application computing system 102, the ESB 108 minimizes, if not prevents, potential inconsistencies of the data.

In some examples, the ESB 108 utilizes the functionalities of the secure store module 220 by communicating (e.g., providing instructions) with the proxy 228 of the secure store module 220 via the secure store proxy 244 of the ESB 108. The secure store module 220 provides encryption of data (e.g., data associated with the message, and/or data associated with the ESB 108). By utilizing the secure store module 220 of the application computing system 102, the ESB 108 minimizes, if not prevents, potential security leaks associated with the data (e.g., data associated with the message, and/or data associated with the ESB 108).

In some examples, the ESB 108 utilizes the functionalities of the user management module 218 by communicating (e.g., providing instructions) with the proxy 226 of the user management module 218 via the user management proxy 242 of the ESB 108. The user management module 218 provides management of user log-in information (e.g., information (username and/or password) associated with a user utilizing the application computing system 102 and/or one or more of the clients 140). Specifically, by the ESB 108 utilizing the log-in information provided by the user management module 218, a central place to handle the log-in information is provided. Furthermore, by the ESB 108 utilizing the log-in information provided by the user management, a user provides log-in information only once during execution of an application on one of the clients 140.

In some examples, the ESB 108 utilizes the functionalities of the configuration module 216 by communicating (e.g., providing instructions) with the proxy 224 of the configuration management module 216 via the configuration proxy 240 of the ESB 108. The configuration module 216 provides means to obtain the configuration information from the application computing system 102. In some examples, the configuration module 216 is included by the secure store module 220, or otherwise under the control of the secure store module 220.

Additionally, in some examples, the ESB 108 can utilize the functionalities of the operations module 212 by communicating (e.g., providing instructions) with the operations proxy 234 of the operations module 212 via the operation module 237. The operations module 212 provides configuration settings, property settings, system status, etc., for maintaining execution of the application computing system 102.

Additionally, in some examples, the ESB 108 can utilize the functionalities of the development repository (module) 215 by communicating (e.g., providing instructions) with the repository proxy 232 via the activation proxy 248. The development repository 215 facilitates transfer of content (e.g., data) that is executed (e.g., processed) by the ESB 108 (e.g., by utilizing one or more modules of the application computing system 102). Furthermore, the content (e.g., the data) can be stored by the development repository 215.

In some further embodiments, the ESB 108 utilizes the functionalities of the on-boarding functionality and on-boarding metadata of the application computing system 102. In some examples, the on-boarding functionalities include, or are associated with, tenant information (e.g., information associated with the clients 140). By providing such tenant information, the ESB 108 facilitates tenant aware isolation.

In some further embodiments, the ESB 108 further integrates with data associated with the application computing system 102 by utilizing the functionalities provided by the application computing system 102 (e.g., the modules 212, 215, 216, 218, 220, 222). Specifically, the ESB utilizes the functionalities of a cloud connector infrastructure (not shown). The cloud connector infrastructure is a component in the on-premise landscape that establishes secure communication between on-demand and on-premise systems.

In some further embodiments, one of the clients 140 is selected as the application computing system 102. For example, one of the clients 140 is implemented as the application computing system 102. Thus, the ESB 108 is integrated with one of the clients 140. In some examples, the ESB 108 is integrated with two or more of the clients 140.

Figure 3A:
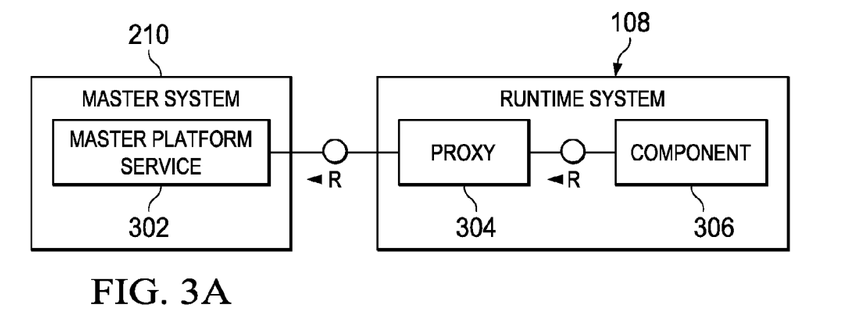
FIGS. 3A and 3B illustrate integration platforms of an enterprise service bus.
Figure 3B:
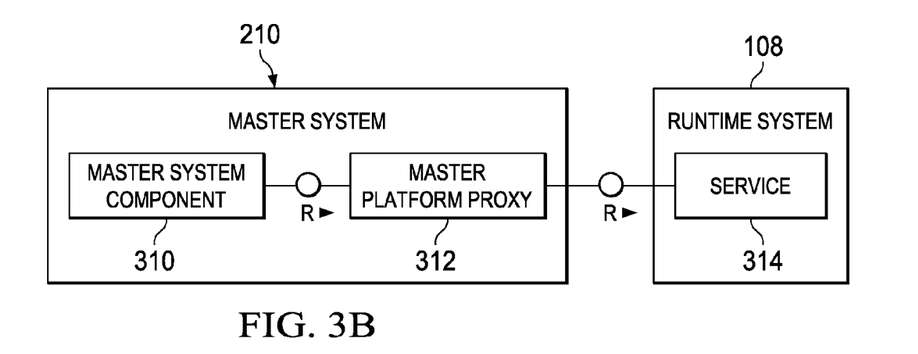

FIGS. 3A and 3B illustrate integration platforms of the ESB 108. Specifically, FIG. 3A illustrates a consume pattern integration platform with respect to integrating the ESB 108 with the application computing system 102; and FIG. 3B illustrates a plug-in pattern integration platform with respect to integrating the ESB 108 with the application computing system 102.

With respect to FIG. 3A, a portion of the application computing system 102 and the ESB 108 is shown. Specifically, the master system 210 of the application computing system 102 is shown including a master platform service module 302 (e.g., an interface of the master system 210); and the ESB 108 includes a proxy 304 (e.g., one of the proxies 240-248) in communication with a component 306 (e.g., a module). The proxy 304 communicates with the master platform service module 302 such that data is provided by the master system 210. The master platform service module 302 is stable and mature to be utilized by the ESB 108. Additionally, the consume pattern integration platform (as illustrated by FIG. 3A) provides the aforementioned persistency, secure store, and the user management.

With respect to FIG. 3B, a portion of the application computing system 102 and the ESB 108 is shown. Specifically, the master system 210 of the application computing system 102 is shown including a master system component 310 in communication with a master platform proxy 312; and the ESB 108 includes a service module 314. The master system component proxy 312 is communicatively coupled with the service module 312 to integrate the ESB 108 with the application computing system 102 such that data is provided by the master system 210. The master platform 310 utilizes the native interface (e.g., the proxy 312), that is, utilizing non-remote interfaces.

Figure 4:
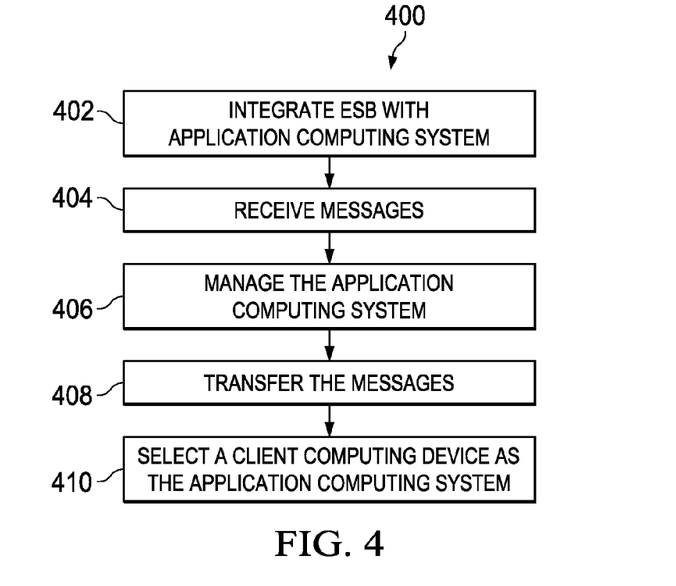
FIG. 4 is a flow chart for integrating a messaging infrastructure with an existing application computing system.

Turning now to FIG. 4, FIG. 4 is a flow chart 400 for integrating a messaging infrastructure with an existing application computing system. For clarity of presentation, the description that follows generally describes method 400 in the context of FIGS. 1, 2, 3A, and 3B. However, it will be understood that method 400 may be performed, for example, by any other suitable system, environment, software, and hardware, or a combination of systems, environments, software, and hardware as appropriate. For example, one or more of the application computing system 102, the ESB 108, the client 140, or other computing device (not illustrated) can be used to execute method 400 and obtain any data from the memory of the application computing system 102, the ESB 108, the client 140, or the other computing device (not illustrated).

In step 402, an enterprise service bus (ESB) is integrated with an existing application computing system. For example, the ESB 108 is integrated with the application computing system 102. Integrating the ESB 108 within the application computing system 102 can include embedding the ESB 108 within the framework/infrastructure of the application computing system 102 such that the ESB 108 utilizes ("reuses") the services provided by the application computing system 102 and "plugs into" the functionalities provided by the application computing system 102. In some examples, the ESB 108 can be integrated within the application computing system 102 via proxies or embedding. In some examples, the application computing system 102 includes (or provides) the (processing) modules 212, 215, 216, 218, 220, 222 that provide functionalities.

In some further embodiments, integrating the ESB 108 with the application computing system 102 can further include integrating the ESB 108 as a runtime system with the application computing system 102.

In step 404, the integrated ESB receives one or more messages from one or more client computing devices communicatively coupled with the application computing system. For example, the ESB 108 receives one or more messages from one or more of the clients 140 that are communicatively coupled with the application computing system 102. The message can include any representation of data, such as text, XML, or binary.

In step 406, the integrated ESB manages the application computing system such that the application computing system communicates with the one or more client computing devices. For example, the ESB 108 manages the application computing system 102 such that the application computing system 102 communicates with the clients 140. Specifically, the ESB 108 manages one or more of the (processing) modules 212, 215, 216, 218, 220, 222 of the application computing system 102 via one or more of the proxies 240-248 and the runtime module 236.

In step 408, the integrated ESB transfers the one or more received messages between the application computing system to one or more of the one or more client computing devices by utilizing the one or more processing modules and the one or more functionalities of the application computing system. For example, the ESB 108 transfers the received message (from the particular client 140 or clients 140) between the application computing system 102 to one or more of the clients 140 by utilizing the (processing) modules 212, 215, 216, 218, 220 222 and the functionalities of the application computing system 102. Specifically, in some examples, the ESB 108 receives the message (or messages) from one or more particular clients 140, as mentioned above, and transfers the received message utilizing the application computing system 102 and one or more modules 212, 215, 216, 218, 220, 222 and the associated functionalities of the modules to one or more other clients 140 (e.g., one or more clients 140 other than the particular client(s) 140 that provided (e.g., initiated) the message).

In step 410, one of the one or more client computing devices is selected as the application computing system. Specifically, one of the clients 140 is implemented as the application computing system 102. Thus, the ESB 108 is integrated with one of the clients 140.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, WINDOWS, MAC OS, ANDRIOD, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
   integrating an enterprise service bus (ESB) with an existing application computing system at a connectivity level, the application computing system including one or more processing modules providing one or more functionalities, each of the one or more processing modules including a respective first proxy, the integrated ESB including one or more second proxies each associated with a respective processing module;
   in response to integrating the ESB with the existing application computing system, providing, by the integrated ESB, an access point to initiate an instance of the integrated ESB, the access point based on the connectivity level;
   determining that the connectivity level is an on-demand connectively level, and in response, providing an application programming interface to initiate the instance of the integrated ESB automatically and the information to employ the instance of the integrated ESB is returned and stored by the existing application computing system;
   determining that the connectivity level is an on-premise connectively level, and in response, providing a script to initiate the instance of the integrated ESB and the information to employ the instance of the integrated ESB is stored by the existing application computing system;
   receiving, by the instance of the integrated ESB, a message from a client computing device communicatively coupled with the application computing system, the message indicating a processing architecture associated with the client computing device;
   in response to receiving the message, providing, by the instance of the integrated ESB, instructions to the first proxy of a subset of the one or more processing modules through the one or more second proxies of the integrated ESB, wherein the subset of the one or more processing modules is selected based on the processing architecture associated with the client computing device and the instructions provided to the first proxy of the subset of the one or more processing modules are specific to the particular first proxy and based upon the functionalities associated with the processing module that includes the respective first proxy;

in response to providing the instructions, managing, by the instance of the integrated ESB, the one or more processing modules of the application computing system such that the application computing system communicates with the client computing device; and transferring, by the instance of the integrated ESB, the one or more received messages between the application computing system to the client computing device by utilizing the subset of the one or more processing modules and the one or more functionalities of the application computing system.

2. The computer-implemented method of claim 1, wherein integrating further includes integrating the ESB as a runtime system with the application computing system.

3. The computer-implemented method of claim 1, wherein the application computing system differs from an implementation of at least one of the one or more client computing devices.

4. The computer-implemented method of claim 1, further including selecting one of the one or more client computing devices as the application computing system.

5. The computer-implemented method of claim 1, wherein the one or more processing modules include a persistency service module, a secure store module, an user management module, a configuration management service module, an operations module, and a development repository module.

6. The computer-implemented method of claim 5, wherein the one or more functionalities include:

one or more functionalities of the development repository module includes communicating with an activation proxy of the ESB such that content to be executed by the ESB is transferred to the ESB;

one or more functionalities of the persistency service module includes communicating with a persistency proxy of the ESB to provide persistency of data;

one or more functionalities of the secure store module includes communicating with a secure store proxy of the ESB to provide encryption of data; and one or more functionalities of the user management module service module includes communicating with an user management proxy of the ESB to provide management of user login information.

7. The computer-implemented method of claim 1, wherein the one or more processing modules further includes an on-boarding infrastructure.

8. A non-transitory computer storage medium encoded with a computer program, the program comprising instructions that when executed by one or more computers cause the one or more computers to perform operations comprising:

integrating an enterprise service bus (ESB) with an existing application computing system at a connectivity level, the application computing system including one or more processing modules providing one or more functionalities, each of the one or more processing modules including a respective first proxy, the integrated ESB including one or more second proxies each associated with a respective processing module;

in response to integrating the ESB with the existing application computing system, providing, by the integrated ESB, an access point to initiate an instance of the integrated ESB, the access point based on the connectivity level;

determining that the connectivity level is an on-demand connectively level, and in response, providing an application programming interface to initiate the instance of the integrated ESB automatically and the information to employ the instance of the integrated ESB is returned and stored by the existing application computing system;

determining that the connectivity level is an on-premise connectively level, and in response, providing a script to initiate the instance of the integrated ESB and the information to employ the instance of the integrated ESB is stored by the existing application computing system;

receiving, by the instance of the integrated ESB, a message from a client computing device communicatively coupled with the application computing system, the message indicating a processing architecture associated with the client computing device;

in response to receiving the message, providing, by the instance of the integrated ESB, instructions to the first proxy of a subset of the one or more processing modules through the one or more second proxies of the integrated ESB, wherein the subset of the one or more processing modules is selected based on the processing architecture associated with the client computing device and the instructions provided to the first proxy of the subset of the one or more processing modules are specific to the particular first proxy and based upon the functionalities associated with the processing module that includes the respective first proxy;

in response to providing the instructions, managing, by the instance of the integrated ESB, the one or more processing modules of the application computing system such that the application computing system communicates with the client computing device; and transferring, by the instance of the integrated ESB, the one or more received messages between the application computing system to the client computing device by utilizing the subset of the one or more processing modules and the one or more functionalities of the application computing system.

9. The non-transitory computer storage medium of claim 8, wherein the operation of integrating further includes integrating the ESB as a runtime system with the application computing system.

10. The non-transitory computer storage medium of claim 8, wherein the application computing system differs from an implementation of at least one of the one or more client computing devices.

11. The non-transitory computer storage medium of claim 8, the operations further including selecting one of the one or more client computing devices as the application computing system.

12. The non-transitory computer storage medium of claim 8, wherein the one or more processing modules include a persistency service module, a secure store module, an user management module, a configuration management service module, an operations module, and a development repository module.

13. The non-transitory computer storage medium of claim 12, wherein the one or more functionalities include:

one or more functionalities of the development repository module includes communicating with an activation proxy of the ESB such that content to be executed by the ESB is transferred to the ESB;

one or more functionalities of the persistency service module includes communicating with a persistency proxy of the ESB to provide persistency of data;

one or more functionalities of the secure store module includes communicating with a secure store proxy of the ESB to provide encryption of data; and one or more functionalities of the user management module service module includes communicating with an user management proxy of the ESB to provide management of user login information.

14. The non-transitory computer storage medium of claim 8, wherein the one or more processing modules further includes an on-boarding infrastructure.

15. A system comprising:

one or more hardware processors;

a memory device communicatively coupled to the one or more hardware processors, the memory device storing computer-executable program instructions, the computer-executable program instructions, when executed by the one or more hardware processors, perform operations comprising:

integrating an enterprise service bus (ESB) with an existing application computing system at a connectivity level, the application computing system including one or more processing modules providing one or more functionalities, each of the one or more processing modules including a respective first proxy, the integrated ESB including one or more second proxies each associated with a respective processing module;

in response to integrating the ESB with the existing application computing system, providing, by the integrated ESB, an access point to initiate an instance of the integrated ESB, the access point based on the connectivity level;

determining that the connectivity level is an on-demand connectively level, and in response, providing an application programming interface to initiate the instance of the integrated ESB automatically and the information to employ the instance of the integrated ESB is returned and stored by the existing application computing system, and determining that the connectivity level is an on-premise connectively level, and in response, providing a script to initiate the instance of the integrated ESB and the information to employ the instance of the integrated ESB is stored by the existing application computing system;

receiving, by the instance of the integrated ESB, a message from a client computing device communicatively coupled with the application computing system, the message indicating a processing architecture associated with the client computing device;

in response to receiving the message, providing, by the instance of the integrated ESB, instructions to the first proxy of a subset of the one or more processing modules through the one or more second proxies of the integrated ESB, wherein the subset of the one or more processing modules is selected based on the processing architecture associated with the client computing device and the instructions provided to the first proxy of the subset of the one or more processing modules are specific to the particular first proxy and based upon the functionalities associated with the processing module that includes the respective first proxy;

in response to providing the instructions, managing, by the instance of the integrated ESB, the one or more processing modules of the application computing system such that the application computing system communicates with the client computing device; and transferring, by the instance of the integrated ESB, the one or more received messages between the application computing system to the client computing device by utilizing the subset of the one or more processing modules and the one or more functionalities of the application computing system.

16. The system of claim 15, wherein the operation of integrating further includes integrating the ESB as a runtime system with the application computing system.

17. The system of claim 15, wherein the application computing system differs from an implementation of at least one of the one or more client computing devices.

18. The system of claim 15, the operations further including selecting one of the one or more client computing devices as the application computing system.

19. The system of claim 15, wherein the one or more processing modules include a persistency service module, a secure store module, an user management module, a configuration management service module, an operations module, and a development repository module.

20. The system of claim 19, wherein the one or more functionalities include:

one or more functionalities of the development repository module includes communicating with an activation proxy of the ESB such that content to be executed by the ESB is transferred to the ESB;

one or more functionalities of the persistency service module includes communicating with a persistency proxy of the ESB to provide persistency of data;

one or more functionalities of the secure store module includes communicating with a secure store proxy of the ESB to provide encryption of data; and one or more functionalities of the user management module service module includes communicating with an user management proxy of the ESB to provide management of user login information.

* * * * *